(12) United States Patent
Forgang et al.

(10) Patent No.: US 7,973,532 B2
(45) Date of Patent: Jul. 5, 2011

(54) DOWNHOLE SPREAD SPECTRUM INDUCTION INSTRUMENTS

(75) Inventors: Stanislav W. Forgang, Houston, TX (US); Roland E. Chemali, Humble, TX (US)

(73) Assignee: Baker Hughes Incorporated, Houston, TX (US)

( * ) Notice: Subject to any disclaimer, the term of this patent is extended or adjusted under 35 U.S.C. 154(b) by 615 days.

(21) Appl. No.: 12/048,966

(22) Filed: Mar. 14, 2008

(65) Prior Publication Data
US 2009/0230967 A1  Sep. 17, 2009

(51) Int. Cl.
*G01V 3/30* (2006.01)
(52) U.S. Cl. ........................................ 324/338; 324/335
(58) Field of Classification Search .......... 324/332–335, 324/337–339, 343–346; 175/40–41, 45, 175/50; 702/6–7
See application file for complete search history.

(56) References Cited

U.S. PATENT DOCUMENTS

| | | | |
|---|---|---|---|
| 5,278,507 A | 1/1994 | Bartel et al. | |
| 5,869,968 A | 2/1999 | Brooks et al. | |
| 6,147,496 A | 11/2000 | Strack et al. | |
| 6,586,939 B1 | 7/2003 | Fanini et al. | |
| 6,686,736 B2 | 2/2004 | Schoen et al. | |
| 6,703,837 B1 | 3/2004 | Wisler et al. | |
| 6,711,502 B2 | 3/2004 | Mollison et al. | |
| 7,190,169 B2 | 3/2007 | Fanini et al. | |
| 7,463,035 B2 * | 12/2008 | Merchant et al. | 324/339 |
| 2006/0255810 A1 * | 11/2006 | Yu et al. | 324/338 |

* cited by examiner

*Primary Examiner* — Bot L LeDynh
(74) *Attorney, Agent, or Firm* — Mossman Kumar & Tyler PC

(57) ABSTRACT

A plurality of transmitters on a logging tool are activated simultaneously at substantially the same frequency. When the transmitter outputs are phase-modulated using a mutually orthogonal set of modulating functions, it is possible to recover, from the signal at each receiver, a response corresponding to each of the transmitters.

20 Claims, 4 Drawing Sheets

DOWNHOLE SPREAD SPECTRUM INDUCTION INSTRUMENTS

BACKGROUND OF THE DISCLOSURE

1. Field of the Disclosure

The disclosure is related generally to the field of making resistivity induction measurements using well logging instruments for the purpose of determining the properties of earth formations. More specifically, the disclosure is related to a method for improving the performance and simplifying the mechanical requirements for multi-component induction logging tools and propagation resistivity logging tools.

2. Background of the Art

Electromagnetic induction and wave propagation logging tools are commonly used for determination of electrical properties of formations surrounding a borehole. These logging tools give measurements of apparent resistivity (or conductivity) of the formation that, when properly interpreted, are diagnostic of the petrophysical properties of the formation and the fluids therein.

Downhole induction instruments employ multiple sensing coils which could operate in "stand-alone" or "array" modes. By a "stand-alone" mode we mean having individual pairs of these devices with one coil serving as a transmitter and another as a receiver to sense the secondary magnetic field induced by eddy currents appearing due to formation interaction with the transmitter magnetic field. If the assembly has three or more coils participating in measurement, it would acquire an additional property such as ability to spatially focus magnetic field response. This could be done by either re-arranging eddy current flow path in the formation or by complex weighting the induced magnetic field responses in receivers prior combining them.

However, there is a significant problem in such instruments having multiple arrays. The issue lies in the conventional principle of the tool design and, in particular, the necessity for these arrays to operate in the same frequency range. This typically leads to a sequential (instead of a simultaneous) mode of measurements and often may result in lower than possible accuracy of the acquired data.

The decrease in accuracy results due to both tool movement in the well (which results in recording information from different locations), and decreasing an effective signal acquisition time. There are also restrictions associated with measurement errors due to unavoidable magnetic coupling inside the tool. Yet another limiting factor could be the formation response itself.

Baker Atlas and Shell International E&P jointly developed a multicomponent induction logging tool, 3DEX® to measure the electrical anisotropy of these sequences. This logging tool and its use is described in U.S. Pat. No. 6,147,496 to Strack et al. The instrument comprises three mutually orthogonal transmitter-receiver configurations that provide all necessary data to compute horizontal and vertical resistivities of the formation. These resistivities may then be used in an integrated petrophysical analysis to provide an improved estimate of the laminar sand resistivity and corresponding net oil-in-place. The tool was originally developed for wireline applications, but the principles have been extended to measurement-while-drilling (MWD) applications. We discuss next, as an example, the use of such a device in wireline applications.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by means of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Referring to FIG. 2, the configuration of transmitter and receiver coils in an embodiment of the 3DEX® induction logging instrument of Baker Hughes is shown. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. In one mode of operation of the tool, the $H_{xx}$, $H_{yy}$, $H_{zz}$, $H_{xy}$, and $H_{xz}$ components are measured, though other components may also be used. The arrangement of coils shown in FIG. 2 is not intended to be a limitation, and there are devices in which the different coils are collocated. U.S. patent application Ser. No. 11/858,717 of Signorelli having the same assignee as the present disclosure and the contents of which are incorporated herein by reference teaches the use of collocated antennas for multicomponent resistivity tools.

In instruments with collocated coils, there always exists magnetic coupling between mutually-orthogonal coils assembled in the same place on the mandrel; however, even infinitively accurate design would not free the instrument from interferences. These interferences become dependent on multiple logging factors such as tool eccentricity in the well, borehole wall rugosity and even mud homogeneity.

Having arrays with the leads running along the mandrel from coil terminals to the respective electronic amplifiers, as well as amplifiers themselves with finite input impedances, introduces a load for the coils and thus results in a parasitic current-conduction in the coil itself and displacement one in the associated cables. The currents, in turn, produce magnetic fields which couples in neighboring arrays and thus create errors in form of induced voltages which contribution could not be removed by the following signal processing as these value as phase-synchronized with signals of interest.

The instrument has to produce phase-discriminated measurements of both main (xx, yy or zz) magnetic field components as well as respective cross-components (namely, xy, xz, etc.). However, if all transmitters run simultaneously, it is not possible to separate different components in the receiver, i.e., if receiver X is considered, the voltages induced by magnetic fields from x-, y- and z-directional transmitters could not be distinguished.

One approach may be to have mutually-orthogonal transmitters operating at different frequencies simultaneously. This is a very difficult technical issue, and mutual interference of coherent frequencies remains.

A similar problem is encountered in multiple propagation resistivity tools. In this propagation instrument, two transmitters operate sequentially with respect to any given receiver. There are multiple reasons for this type of measurements; however, the main issue remains the same: if both transmitters run simultaneously there are no prior art devices for separating the respective formation phase-discriminated phase responses induced in the receivers. FIGS. 3A, 3B, and 3C are simplified schematic depictions of several alternative possible antenna configurations which may be utilized in an MPR device implemented as a logging-while-drilling apparatus. See U.S. Pat. No. 5,869,968 to Brooks et al., having the same assignee as the present disclosure. The embodiment of FIG. 3A is a dual transmitter, dual receiver antenna configuration which includes upper receiving antenna 351, lower receiving antenna 357, and closely-spaced transmitting antennas 353, 355 which are positioned intermediate receiving antennas 351, 357. The transmitting and receiving antennas are substantially symmetrically positioned about a center line which is located intermediate transmitting antennas 353, 355.

FIG. 3B is a simplified schematic depiction of another embodiment of the closely-spaced transmitter embodiment of the present disclosure. As is shown, transmitting antennas 363, 365 are positioned at a medial location of measurement tubular. Receiving antennas 359, 361 are located at an upper distal portion of measurement tubular 25. Receiving antennas 367, 369 are located at a lower distal portion of measurement tubular.

FIG. 3C is a simplified schematic representation of yet another embodiment of an MPR device. In this particular embodiment, a single receiving antenna 371 is located at an upper distal portion of measurement tubular. Transmitting antennas 373, 375 are located at a medial portion of measurement tubular, and are closely-spaced to one another, as compared to the spacing between either of the transmitting antennas and the single receiving antenna. Alternatively, receiving antenna 371 could be located at a lower distal portion of measurement tubular 25.

There are several hardware and/or calibration solutions to the problems of stray coupling. See, for example, U.S. Pat. No. 6,586,939 to Fanini et al., U.S. Pat. No. 7,190,169 to Fanini et al., and U.S. patent application Ser. No. 11/627,172 of Forgang et al. This disclosure is directed towards a method and apparatus which effectively avoids the coupling problem.

SUMMARY OF THE DISCLOSURE

One embodiment of the disclosure is a method of well logging operations. The method includes conveying a logging tool into a borehole in an earth formation, oscillating a first transmitter and at least one additional transmitter simultaneously on the logging tool at a first frequency, receiving a signal at least one receiver resulting from the operation of the first transmitter and the at least one additional transmitter, processing the received signal to give a first signal indicative of a response of the at least one receiver to the operation of the first transmitter only and a second signal indicative of a response of the at least one receiver to the operation of the at least one additional transmitter only. The method further includes determining from the first signal and the second signal of value of a property of the earth formation. Operating the first transmitter may include modulating the first transmitter using a first modulating function, and operating the at least one additional transmitter may include modulating the at least one additional transmitter using a second modulating function substantially orthogonal to the first modulating function. At least one of the modulating functions may be a phase modification. The phase modulation may include a pseudo-random binary sequence. The method may further include orienting the at least one additional transmitter with its axis substantially orthogonal to an axis of the first transmitter. The property may be selected from a porosity of a formation, a fractional volume of a shale in the formation, a resistivity of a shale in a laminated reservoir including sands that may have dispersed shales therein, a distribution of shales, sands and water in a reservoir, a horizontal resistivity of the formation, a vertical resistivity of the formation, and/or a pseudo-image of the formation. The method may further include determining a distance to an interface in the formation. The method may further include controlling a correction of drilling of the borehole using the determined distance. The method may further include conveying the logging tool into the borehole on a conveyance device selected from a wireline and a drilling tubular.

Another embodiment is an apparatus for conducting well logging operations. The apparatus includes a logging tool configured to be conveyed into a borehole in an earth formation. The logging tool also includes a first transmitter and at least one additional transmitter configured to be incorporated simultaneously at a first frequency. The apparatus includes at least one receiver configured to receive a signal resulting from the operation of the first transmitter and the at least one additional transmitter. The apparatus also includes at least one processor configured to process the received signal to give a first signal indicative of a response of the at least one receiver to operation of the first transmitter only and a second signal indicative of the response of the at least one receiver to the operation of the at least one additional transmitter only, and determine from the first signal and the second signal of value of a property of the earth formation. The first transmitter may be further configured to be modulated using a first modulating function and the at least one additional transmitter may be further configured to be modulated using a second modulating function substantially orthogonal to the first modulating function. At least one of the modulating functions may be a phase modulation. The phase modulation may include a pseudo-random binary sequence. The at least one additional transmitter may be oriented with its axis substantially orthogonal to an axis of the first transmitter. The property configured to be determined by the at least one processor may be a porosity of a formation, a fractional volume of a shale in the formation, a resistivity of a shale in a laminated reservoir including sands that may have dispersed shales therein, a distribution of shales, sands and water in a reservoir, a horizontal resistivity of the formation, a vertical resistivity of the formation, and/or a pseudo-image of the formation. The at least one processor may be further configured to determine a distance to an interface in the formation. The at least one processor may be further configured to control the direction of drilling of the borehole using the determined distance. The apparatus may further include a conveyance device configured to convey the logging tool into the borehole, the conveyance device being a wireline or a drilling tubular.

Another embodiment is a computer-readable medium for use with an apparatus for conducting well logging operations. The apparatus includes a logging tool configured to be conveyed into a borehole in an earth formation, a first transmitter and at least one additional transmitter on the logging tool configured to be operated simultaneously at a first frequency, and at least one receiver configured to receive a signal resulting from the operation of the first transmitter and at least one additional transmitter. The medium includes instructions enable at least one processor to process the received signal to give a first signal indicative of a response of the at least one receiver to the operation of the first transmitter only and a second signal indicative of a response of the at least one receiver to the operation of the at least one additional transmitter only, and determine from the first signal and the second signal of value of the property of the earth formation. The medium may further include a ROM, an EPROM, an EEPROM, a flash memory and/or an optical disk.

BRIEF DESCRIPTION OF THE FIGURES

The present disclosure is best understood with reference to the following figures in which like numbers refer to like components FIG. 1 (Prior Art) shows an induction instrument disposed in a wellbore penetrating earth formations.

DETAILED DESCRIPTION OF THE DISCLOSURE

Figure 1:
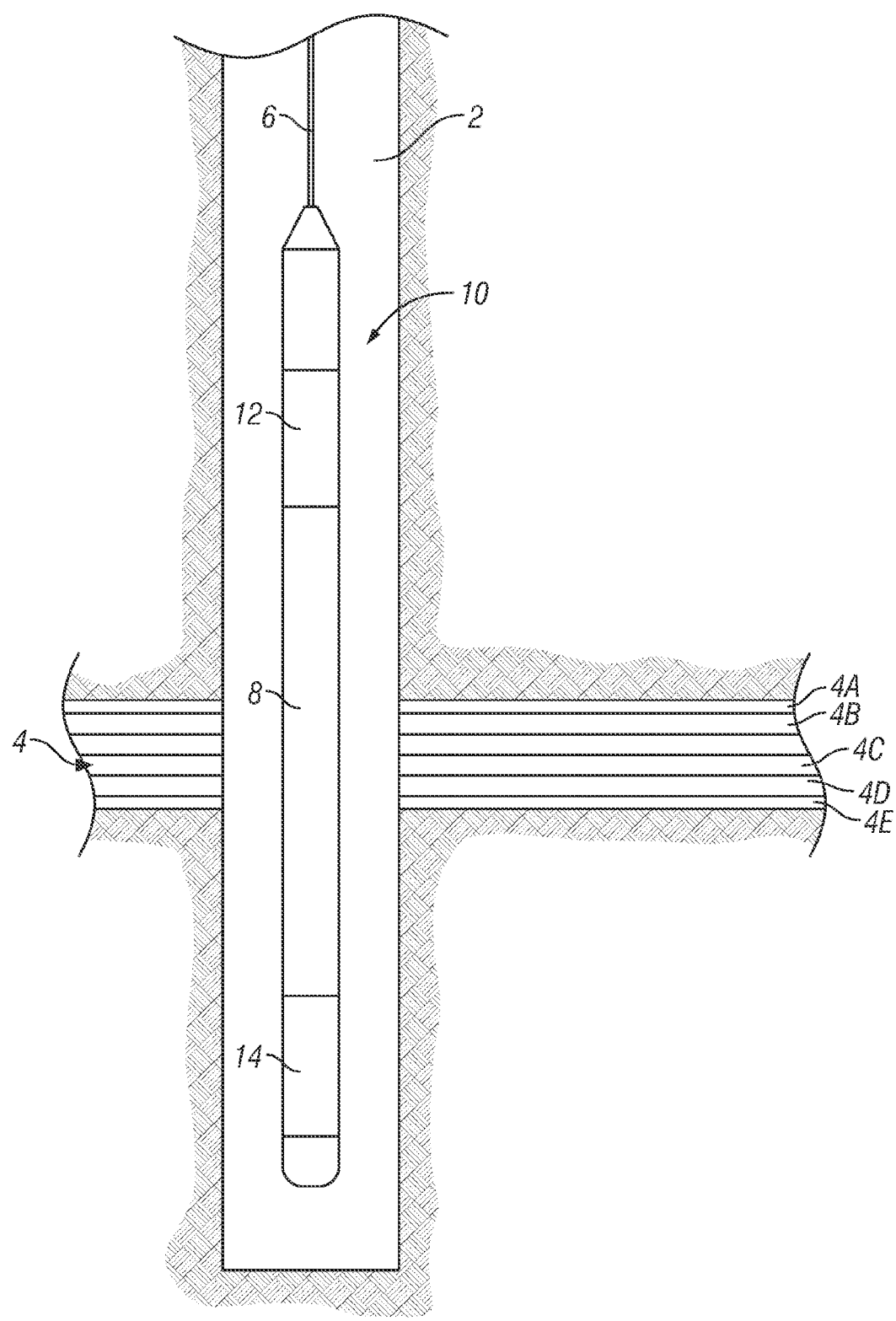

The present disclosure may be used with wireline conveyed tools (See FIG. 1) or with logging tools conveyed on a drilling tubular. It is suitable for use with array induction tools or with MPR tools.

The present disclosure is based on the application of spread-spectrum method known and utilized in the telecommunication industry and applying it to downhole induction instruments. In particular, in one embodiment of the disclosure, the direct-sequence spread spectrum method is used and, for exemplary purposes, the following description is based on its principles.

Figure 2:
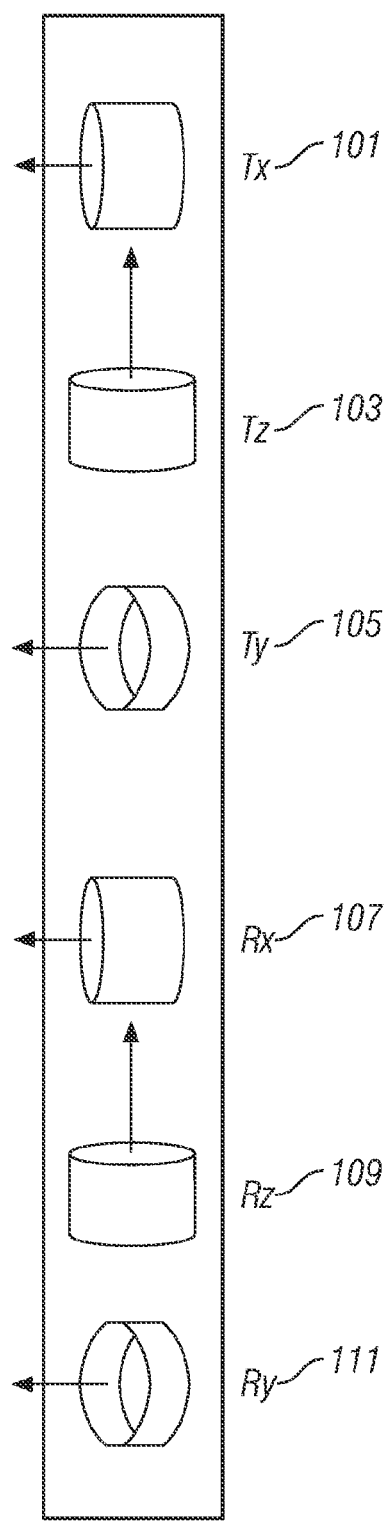
FIG. 2 (Prior Art) shows the arrangement of transmitter and receiver coils in an embodiment of the present disclosure marketed under the name 3DEX®
Figure 3A:
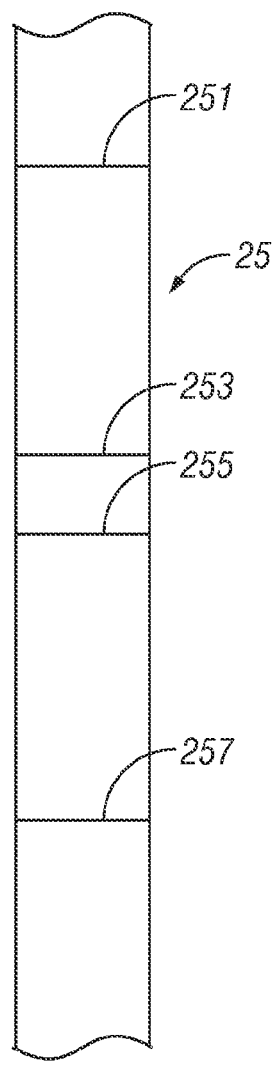
FIGS. 3A, 3B and 3C (Prior Art) provide schematic views of exemplary antenna configurations for an MPR tool.
Figure 3B:
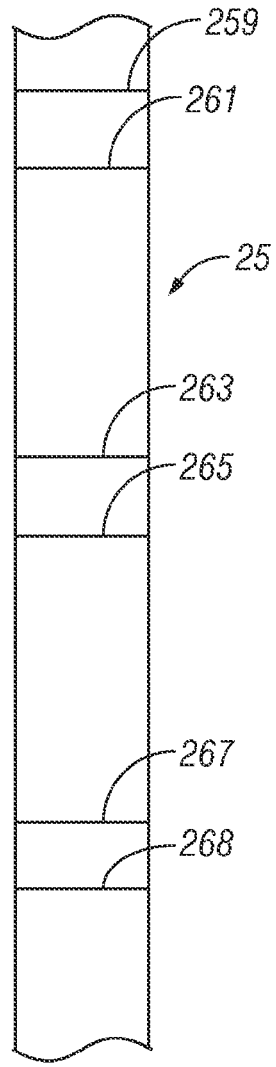
Figure 3C:
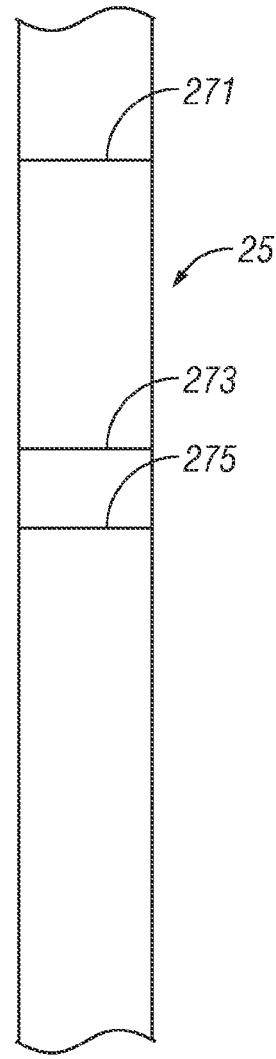
Figure 4A:
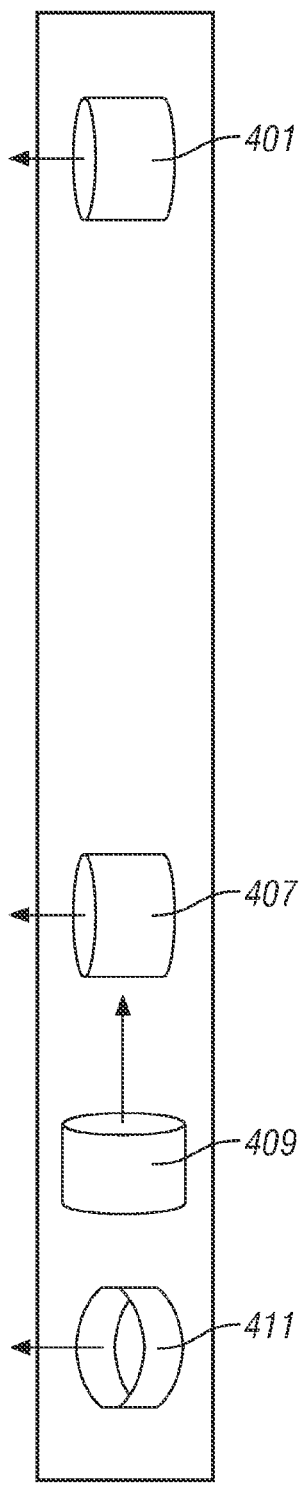
FIGS. 4A-4C shows a partitioning of a 3DEX® transmitter-receiver arrangement into three arrays.
Figure 4B:
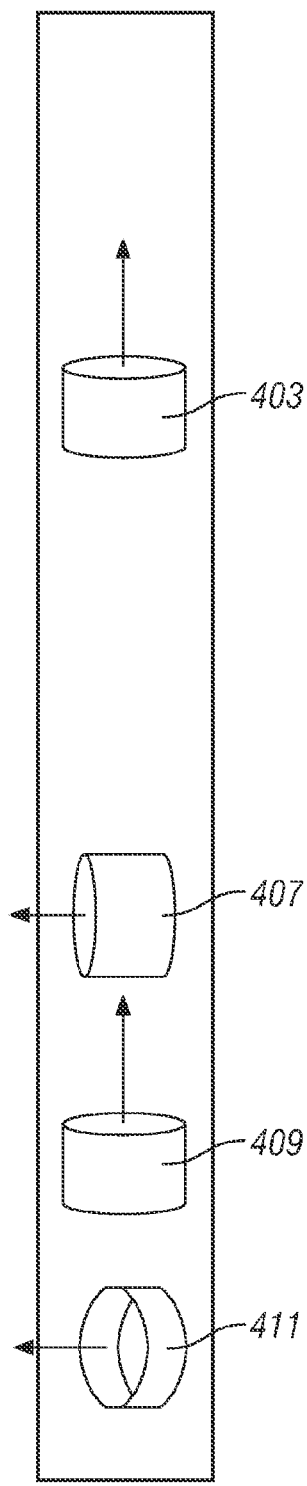
Figure 4C:
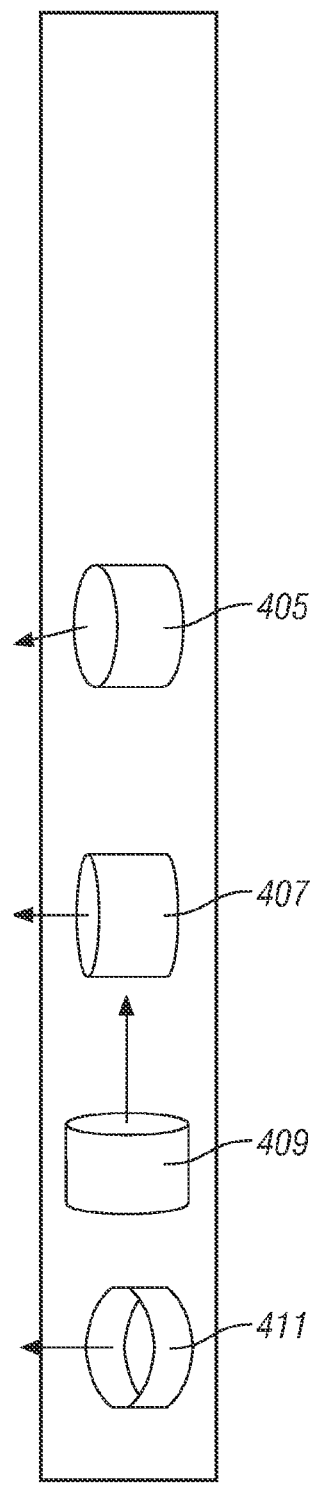

For the purposes of discussion, we may regard the transmitter-receiver array of FIG. 2 as consisting of three arrays. The first, shown in FIG. 4A, has transmitter 401 and three receivers 407, 409, 411; the second array, shown in FIG. 4B, has transmitter 403 and three receivers 407, 409, 411; and the third array, shown in FIG. 4C, has transmitter 405 and three receivers 407, 409, 411. A similar breakup of any array, such as those shown in FIGS. 3A-3C may be done. It should be noted that any combination of induction, propagation, transverse and collocated coils may be partitioned in this fashion.

Each of the arrays has its own signal transmission-processing engine realized either in hardware or software, or both; i.e., each transmitter electronics and receiver acquisition are synchronized allowing for high fidelity phase-sensitive measurements of the voltage induced in a receiver of an array due to eddy currents in the formation resulting from the activation of the transmitter of the array. Synchronization is much easier in a logging tool than in communication systems where the ideas below were first implemented and where it must be done between remote transmitters and receivers.

Denoting by $S_i$ the signal applied to the i-th transmitter, in the present method each of the transmitters is operated at a frequency $f_0$ and has its phase modulated by $\phi_i(t)$:

$$S_i(t)=A \sin(2\pi f_0 t+\phi_i(t)) \quad (1).$$

The phase modulation is done at a higher clock frequency, typically by a factor greater than 10, than the frequency $f_0$ of the transmitter signal. In addition, the modulating functions are selected to form an orthogonal set, i.e.

$$\frac{1}{T_{max}}\int_0^{T_{max}} \phi_i(t)\phi_j(t) = 0, i \neq j, \ = R, i = j., \quad (2)$$

where R has a known value, and the integration time $T_{max}$ is sufficiently large.

Under these conditions, it can be shown that:

$$\int_0^{T_{max}} S_i(t)S_j(t)dt = \frac{A^2}{2\pi}T_{max}\delta_{ij} + N(t), \quad (3)$$

where $\delta_{ij}=1$ for i=j and $\delta_{ij}=0$ for i≠j, and N(t) is quasi-white noise.

Thus, when a plurality of transmitters are operated simultaneously with the modulating function discussed above, the total induced receiver voltage is processed by respective $M^{th}$ receiver acquisition engine with its "sampling" clock being tightly phase-synchronized with respective $M^{th}$ array transmitter voltage only. It can be shown that after phase detection or deconvolution of the acquired voltage, the engine output signal would contain an analog or digital signal proportional to the real component of the magnetic field induced by eddy currents in the formation appearing due to $M^{th}$ transmitter in each of the receivers, an analog or digital signal proportional to the imaginary component of the magnetic field induced by eddy currents in the formation appearing due to $M^{th}$ transmitter in each of the receivers, and quasi-white noise due to the rest of the transmitters operating in the tool. The first two terms correspond to the first term on the right side of eqn. (3) while the noise term is the second term on the right hand side of eqn. (3). The noise magnitude N(t) and spectrum composition would depend on the pre-defined shape and cross-correlation coefficients between $\phi_i(t)$ and $\phi_j(t)$ as well as on the integration time $T_{max}$. Additional attenuation of the remaining noise could be done by known method such as, for instance, multiple-sample stacking.

It should be noted that the simplest realization of the phase modulation would be by a pseudo-binary random sequence, in which the phase changes in the $M^{th}$ channel occur from a value +α to −α at random times. However, implementing such a sequence on a transmitter is difficult, particularly at the high frequencies used for MPR tools. For MPR, it is possible to achieve the separation by having, for example, a first transmitter at a frequency $f_0$ and a second transmitter at a frequency $f_0+\epsilon$. This would correspond to a phase modulation where $\phi(t)=2\pi\epsilon t$ in eqn. (1). Using coherent detection, separation of the transmitter signals can be achieved.

Those versed in the art and having benefit of the present disclosure would recognize that the phase modulation would effectively result in radiation of a non-monochromatic magnetic field even with a nominally monochromatic source. The formation response would be dispersive and the real and imaginary components of the receiver signal would be integrated over an effective frequency band. The band-width could be estimated and, if necessary, adjusted during tool preparation based on required signal-to-noise accuracy and pre-logging information regarding geo-electric conditions of the investigated formation.

Once the measurements have been made and separated, all of the prior art methods may be used to determine formation properties. These include, for example, determination of total porosity of a formation, a fractional volume of the shale, and a resistivity of the shale in a laminated reservoir including sands that may have dispersed shales therein; (see U.S. Pat. No. 6,711,502 to Mollison et al.); and determination of the distribution of shales, sands and water in a reservoir including laminated shaly sands using vertical and horizontal conductivities from nuclear, NMR, and multi-component induction data (see U.S. Pat. No. 6,686,736 to Schoen et al.); generation of a pseudo-image and reservoir navigation by combining deep-reading azimuthally sensitive resistivity measurements with azimuthally insensitive resistivity measurements made by a multiple propagation resistivity tool (see U.S. patent application Ser. No. 11/489,875 of Wang et al.). These are known in the art and are not discussed further.

For the purposes of this disclosure, the term "downhole assembly" is used to refer to a string of logging instruments conveyed into the borehole on a wireline or to a bottomhole assembly conveyed on a drilling tubular. The method described above may be implemented using a logging tool that is part of any type of downhole assembly.

Implicit in the processing of the data is the use of a computer program on a suitable machine-readable medium that enables the processor to perform the control and processing. The machine-readable medium may include ROMs, EPROMs, EEPROMs, Flash Memories and Optical disks.

What is claimed is:

1. A method of well logging operations comprising:
   (a) conveying a logging tool into a borehole in an earth formation;
   (b) operating a first transmitter and at least one additional transmitter simultaneously on the logging tool at a first frequency;
   (c) receiving a signal at least one receiver resulting from the operation of the first transmitter and the at least one additional transmitter;
   (d) processing the received signal to give a first signal indicative of a response of the at least one receiver to the operation of the first transmitter only and a second signal indicative of a response of the at least one receiver to the operation of the at least one additional transmitter only;
   (e) determining from the first signal and the second signal a value of a property of the earth formation; and
   (f) recording the determined value of the property on a suitable medium.

2. The method of claim 1 wherein operating the first transmitter further comprises modulating the first transmitter using a first modulating function, and operating the at least one additional transmitter further comprises modulating the least one additional transmitter using a second modulating function substantially orthogonal to the first modulating function.

3. The method of claim 2 wherein at least one of the modulating functions comprises a phase modulation.

4. The method of claim 3 wherein the phase modulation further comprises a pseudo-random binary sequence.

5. The method of claim 1 further comprising orienting the at least one additional transmitter with its axis substantially orthogonal to an axis of the first transmitter.

6. The method of claim 1 wherein the property is selected from the group consisting of: (i) a porosity of a formation, (ii) a fractional volume of a shale in the formation, (iii) a resistivity of a shale in a laminated reservoir including sands that may have dispersed shales therein, (iv) a distribution of shales, sands and water in a reservoir, (v) a horizontal resistivity of the formation, (vi) a vertical resistivity of the formation, and (vii) a pseudo-image of the formation.

7. The method of claim 1 further comprising determining a distance to an interface in the formation.

8. The method of claim 7 further comprising controlling a direction of drilling of the borehole using the determined distance.

9. The method of claim 1 further comprising conveying the logging tool into the borehole one a conveyance device selected from: (i) a wireline, and (ii) a drilling tubular.

10. An apparatus for conducting well logging operations comprising:
    (a) a logging tool configured to be conveyed into a borehole in an earth formation;
    (b) a first transmitter and at least one additional transmitter on the logging tool configured to be operated simultaneously at a first frequency;
    (c) at least one receiver configured to receive a signal resulting from the operation of the first transmitter and the at least one additional transmitter;
    (d) at least one processor configured to:
       (A) process the received signal to give a first signal indicative of a response of the at least one receiver to the operation of the first transmitter only, and a second signal indicative of a response of the at least one receiver to the operation of the at least one additional transmitter only; and
       (B) determine from the first signal and the second signal a value of a property of the earth formation.

11. The apparatus of claim 10 wherein the first transmitter is further configured to be modulated using a first modulating function and the at least one additional transmitter is further configured to be modulated using a second modulating function substantially orthogonal to the first modulating function.

12. The apparatus of claim 11 wherein at least one of the modulating functions comprises a phase modulation.

13. The apparatus of claim 12 wherein the phase modulation further comprises a pseudo-random binary sequence.

14. The apparatus of claim 10 wherein the at least one additional transmitter is oriented with its axis substantially orthogonal to an axis of the first transmitter.

15. The apparatus of claim 10 wherein the property configured to be determined by the at least one processor is selected from the group consisting of: (i) a porosity of a formation, (ii) a fractional volume of a shale in the formation, (iii) a resistivity of a shale in a laminated reservoir including sands that may have dispersed shales therein, (iv) a distribution of shales, sands and water in a reservoir, (v) a horizontal resistivity of the formation, (vi) a vertical resistivity of the formation, and (vii) a pseudo-image of the formation.

16. The apparatus of claim 10 wherein the at least one processor is further configured to determine a distance to an interface in the formation.

17. The apparatus of claim 10 wherein the at least one processor is further configured to control a direction of drilling of the borehole using the determined distance.

18. The apparatus of claim 10 further comprising a conveyance device configured to convey the logging tool into the borehole, the conveyance device selected from: (i) a wireline, and (ii) a drilling tubular.

19. A computer-readable medium for use with an apparatus for conducting well logging operations, the apparatus comprising:
(a) a logging tool configured to be conveyed into a borehole in an earth formation;
(b) a first transmitter and at least one additional transmitter on the logging tool configured to be operated simultaneously at a first frequency; and
(c) at least one receiver configured to receive a signal resulting from the operation of the first transmitter and the at least one additional transmitter;
the medium comprising instructions that enable at least one processor to:
(d) process the received signal to give a first signal indicative of a response of the at least one receiver to the operation of the first transmitter only and a second signal indicative of a response of the at least one receiver to the operation of the at least one additional transmitter only; and
(e) determine from the first signal and the second signal a value of a property of the earth formation.

20. The medium of claim 19 further comprising at least one of: (i) a ROM, (ii) an EPROM, (iii) an EEPROM, (iv) a flash memory, and (v) an optical disk.

* * * * *